United States Patent
Zan et al.

(10) Patent No.: US 11,122,065 B2
(45) Date of Patent: Sep. 14, 2021

(54) ADAPTIVE ANOMALY DETECTION FOR COMPUTER SYSTEMS

(71) Applicant: VMware, Inc., Palo Alto, CA (US)

(72) Inventors: Bin Zan, Santa Clara, CA (US); Dexiang Wang, Sunnyvale, CA (US); Zhen Mo, Sunnyvale, CA (US); Vijay Ganti, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 376 days.

(21) Appl. No.: 16/103,108

(22) Filed: Aug. 14, 2018

(65) Prior Publication Data

US 2020/0059482 A1 Feb. 20, 2020

(51) Int. Cl.
*H04L 29/06* (2006.01)
*G06K 9/62* (2006.01)

(52) U.S. Cl.
CPC ........ *H04L 63/1425* (2013.01); *G06K 9/6223* (2013.01); *G06K 9/6272* (2013.01); *H04L 63/1416* (2013.01)

(58) Field of Classification Search
CPC ............. H04L 63/1425; H04L 63/1416; H04L 63/0227; G06K 9/6223; G06K 9/6272
See application file for complete search history.

(56) References Cited

U.S. PATENT DOCUMENTS

| | | | |
|---|---|---|---|
| 7,424,619 B1 | 9/2008 | Fan et al. | |
| 8,800,036 B2 | 8/2014 | Khayam et al. | |
| 9,544,321 B2 | 1/2017 | Baikalov et al. | |
| 9,699,206 B2 | 7/2017 | Neil | |
| 10,659,477 B2* | 5/2020 | Choi | H04L 63/1425 |
| 2013/0097706 A1* | 4/2013 | Titonis | G06F 21/566 726/24 |
| 2015/0220847 A1* | 8/2015 | Shibuya | G06N 20/00 706/12 |
| 2015/0363925 A1* | 12/2015 | Shibuya | F01D 25/00 345/440 |
| 2016/0285700 A1 | 9/2016 | Gopalakrishnan et al. | |

OTHER PUBLICATIONS

Pelleg, Dan, and Moore, Andrew "X-means: Extending K-means with Efficient Estimation of the Number of Clusters", In Proceedings of the 17th International Conf. on Machine Learning, 2000, Pittsburg, PA, US, pp. 1-8.

* cited by examiner

*Primary Examiner* — Khoi V Le

(57) ABSTRACT

Feature vectors are abstracted from data describing application processes. The feature vectors are grouped to define non-anomalous clusters of feature vectors corresponding to normal application behavior. Subsequent feature vectors are considered anomalous if they do not fall within one of the non-anomalous clusters; alerts are issued for anomalous feature vectors. In addition, the subsequent feature vectors may be used to regroup feature vectors to adapt to changes in what constitutes normal application behavior.

12 Claims, 4 Drawing Sheets

| ALLOWED BEHAVIOR TABLE XXX | |
|---|---|
| FIELDS XXX | VALUES |
| ALLOWED BEHAVIOR ID | |
| PROCESS COMMAND & ARGUMENTS | |
| FULL PATH NAME | |
| HASH OF PROCESS | |
| PROCESS CREATED TIME | |
| PROCESS LAST-UPDATE TIME | |
| ID OF SERVICE | |
| SOURCE OF BEHAVIOR | |
| ORIGINAL ALARM ID (OF USER-DEFINED BEHAVIOR) | |
| PACKAGE STORE ID | |
| PROCESS 256 HASH | |
| ABNORMAL STATUS | |
| COMMENTS | |
| LAST TIME ABNORMAL STATUS UPDATED | |

FIG. 3

| ALLOWED CONNECTION TABLE XXX | |
|---|---|
| FIELDS XXX | VALUES |
| CONNECTION ID | |
| REMOTE ADDRESS | |
| REMOTE PORT | |
| CONNECTION CREATED TIME | |
| CONNECTION LAST UPDATE TIME | |
| ALLOWED BEHAVIOR ID | |
| CONNECTION TYPE | |
| DESTINATION SERVICE ID | |
| USER ID THAT CREATED CONNECTION | |
| LOCAL ADDRESS | |
| LOCAL PORT | |
| PROTOCOL & SOURCE OF CONNECTION | |

FIG. 4

MULTI-BIT VALUES

| FEATURE VECTOR XXX | |
|---|---|
| HEADER XXX | |
| FEATURE RECORD ID | |
| COMMAND LINE & ARGUMENT ID | |
| FEATURES XXX | |
| CONNECTION IS OUTGOING ipv4 & HAS PUBLIC ADDRESS | |
| CONNECTION IS OUTGOING ipv4 & HAS PRIVATE ADDRESS | |
| CONNECTION IS OUTGOING ipv6 & HAS PUBLIC ADDRESS | |
| CONNECTION IS OUTGOING ipv6 & HAS PRIVATE ADDRESS | |
| OUTGOING WELL-KNOWN TCP PORTS | |
| OUTGOING WELL-KNOWN UDP PORTS | |
| OUTGOING EPHEMERAL TCP PORT | |
| OUTGOING EPHEMERAL UDP PORT | |
| OUTGOING OTHER TCP PORT | |
| OUTGOING OTHER UDP PORT | |
| INBOUND EPHEMERAL TCP PORT | |
| INBOUND EPHEMERAL UDP PORT | |
| INBOUND OTHER TCP PORT | |
| INBOUND OTHER UDP PORT | |
| ADDITIONAL BITS TO IDENTIFY WELL-KNOWN PORTS | |

BINARY VALUES

FIG. 5

ADAPTIVE ANOMALY DETECTION FOR COMPUTER SYSTEMS

BACKGROUND

Enterprise applications, such as retail websites, may suffer disruption due to malfunctions and malicious attacks. Blacklists and whitelists are two approaches to avoiding such disruptions. Blacklists identify sources of disruptions directly. A whitelist identifies normal behaviors; behaviors that do not match an item on a whitelist can be flagged as anomalies and potential sources of disruption. One advantage of a whitelist is that it can detect a first occurrence of a problem that a blacklist would have to be updated to detect.

BRIEF DESCRIPTION OF THE DRAWINGS

FIG. 3 is an allowed-behavior table.

FIG. 4 is an allowed-connection table.

FIG. 5 is a schematic diagram of a feature vector.

DETAILED DESCRIPTION

The present invention provides a whitelist that adapts as the behaviors of the respective application evolve. Process data is captured describing various application processes. Feature vectors are extracted from the process data and are arranged as datapoints in a multi-dimensional vector space. The datapoints are grouped into clusters, e.g., defined by respective centroids and diameters or radii. Subsequently acquired datapoints that fall outside these clusters may be flagged as anomalies. (The subsequently acquired datapoints may be filtered to reduce the number of false positives.) Also, datapoints acquired after clusters are defined may be used to adjust or re-determine the clusters to reflect changes in the normal behaviors of the application.

Figure 1:
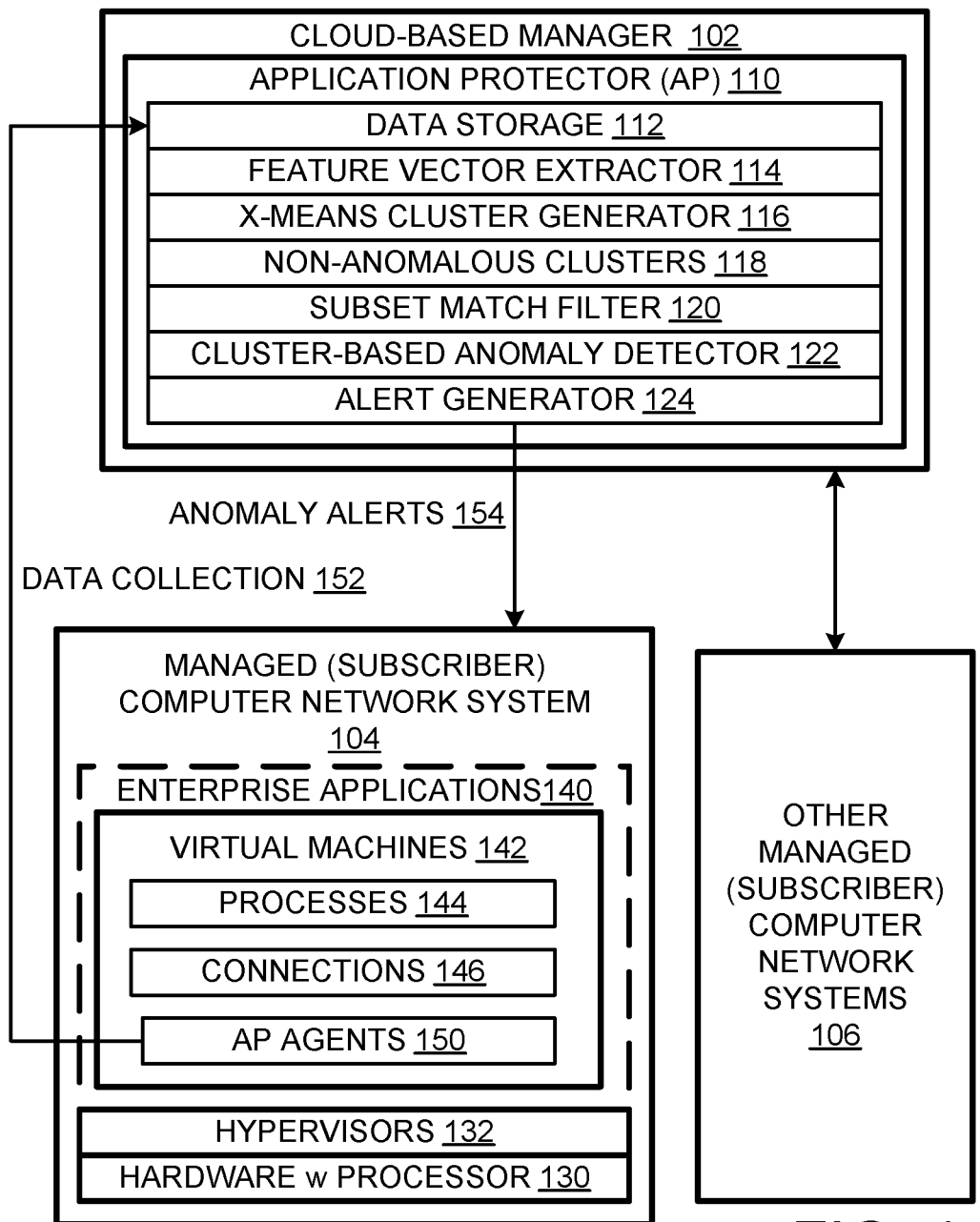
FIG. 1 is a schematic diagram of a computer system including an application protector.

A cloud-based computer-network management system 100, shown in FIG. 1, includes a cloud-based computer-network manager 102, a managed computer-network system 104, and other managed computer-network systems 106. Cloud-based manager 102 includes an application protector (AP) 110. Application protector 110 includes data storage 112, a feature-vector extractor 114, an X-means cluster generator 116, non-anomalous clusters 118, a subset match filter 120, a cluster-based anomaly detector 122, and an alert generator 124.

Managed system 104 includes hardware 130 including one or more processors and one or more hypervisors 132 for virtualizing the hardware to support one or more enterprise applications 140. Each enterprise application includes plural virtual machines 142. Each virtual machine, at any given time, is executing processes 144, which, in turn, are making respective connections 146. Installed in each virtual machine 142 is a respective application-protector (AP) agent 150 of application protector 110. Each application-protector agent 150 collects process data characterizing processes 144 and connections 146 of virtual machines 106. Agents 150 provide data collections 152 to application protector 110, which issues anomaly alerts 154 based on data collections 152.

The illustrated embodiment uses an X-means clustering approach; another embodiment uses the more traditional K-means approach. The X-means approach has the following advantages: 1) it scales better; 2) the X-means approach can determine an optimal number of clusters, whereas the K-means approach is limited to a number provided to it; and 3) a local minimum issue is reduced.

The X-means approach starts with a number "k" of clusters equal to the lower bound of the given range and continues to add centroids as needed until a diminishing-returns threshold is reached. The X-means approach consists of the following two operations repeated until completion: Improve-Params and Improve-structure. The improve-params consists of running conventional K-means to convergence. The improve-structure operation finds out whether and where new centroids should appear. See "X-means: Extending K-means with efficient estimation of the number of clusters—Pelleg, Moore—2000, In Proceedings of the 17th International Conf. on Machine Learning.

Figure 2:
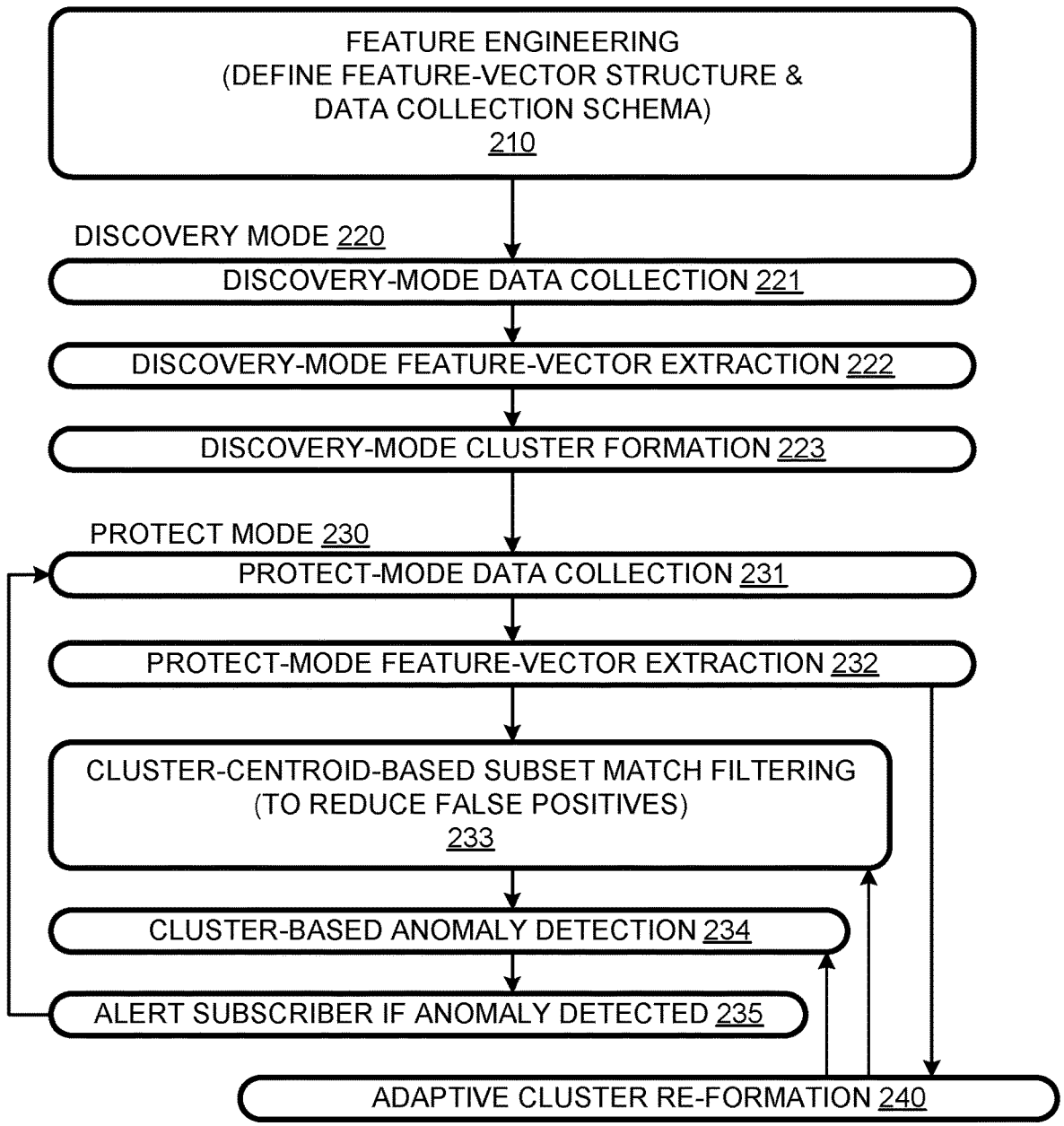
FIG. 2 is a flow chart of an application-protection process implementable in the computer system of FIG. 1 and in other systems.

A process 200, implementable in system 100 and in other systems, is flow-charted in FIG. 2. At 210, feature engineering defines the structure of feature vectors and the data collection schema. The data collection schema are represented in FIGS. 3 and 4 in the form of allowed-behavior table 300 and allowed-connection table 400. The feature-vector structure is represented in one instance as feature vector 500 in FIG. 5. Feature engineering 210 is followed by a discovery mode 220 and a protect mode 230.

Discovery mode 220 is designed to establish an initial set of clusters. At 221, discovery-mode data collection is performed. Each process of each virtual machine is characterize using the parameters of table 300, FIG. 3, while each connection is characterized using the parameters of table 400, FIG. 4.

At 222, features are extracted from the data collected at 221. In effect, feature extraction involves determining which features represented in the feature vector are present in a given process instance. For each feature listed in FIG. 5, a "1" indicates the feature is present in the process instance and a "0" indicates that it is not. Of course, the meanings of "0" and "1" can be reversed. For generality, one can say a "true" value can indicate the feature is present, while a "false" value can indicate that it is not.

At 223, discovery-mode cluster formation is performed. The feature vectors extracted at 222 are arranged in groups by proximity. While a conventional K-means approach can be used to form the clusters, the illustrated embodiment uses an X-means approach, which has several advantages. For example, while the K-means approach requires the number of clusters to be predetermined, while the X-means approach can determine an appropriate number of clusters according to a diminishing returns threshold. For the most part, clusters represent normal operation, while points outside the clusters represent potential anomalies. However, clusters with at most a few datapoints may also be deemed to be anomalies. The other, non-anomalous, clusters are used for detecting anomalous processes.

Once the discovery-mode clusters are determined and characterized, e.g., by centroid and its radius (or diameter), process 200 is switched from discovery mode 220 to protect mode 230. At 231, protect-mode data collection is performed; protect-mode data collection is essentially the same as discovery-mode data collection except that it is performed during protect mode 230. Likewise, protect-mode feature extraction 232 is basically the same as discovery-mode feature extraction.

At 233, cluster-centroid-based subset match filtering is performed to reduce false positive anomaly detections. Each centroid corresponds to a feature vector of binary values assigned to the features listed in FIG. 5. Each incoming feature vector that only has 1s ("true" values) in positions that a centroid has 1s is filtered out. For example, a feature vector with three of the five 1s in a centroid is filtered out providing it has no 1s in positions in which the centroid has a zero.

In general, incoming feature vectors in which the set of all positions occupied by 1s ("true" values) is a non-empty but possibly exhaustive subset of the set of all positions occupied by 1s in a centroid is filtered out from further consideration as an anomaly. The basic idea is that some features may not have occurred at the time the process data for the incoming feature vector was collected but may appear later. Incoming feature vectors in which the set of all positions with 1s not a subset of the set of all positions with 1s of the centroid of a non-anomalous cluster are passed on for further consideration as possibly anomalous.

At 234, for the feature vectors that are passed by the filtering at 233, a determination is made whether or not they are within at least one anomalous cluster. For example, if the cluster is defined by a centroid and a radius about that centroid, then the distance of each passed feature vector from each centroid is compared to the radius of the cluster corresponding to that centroid to determine whether the feature vector is within or outside that cluster. If the passed feature vector is outside of every non-anomalous cluster, then the feature vector is considered anomalous. At 235, in response to a detection of an anomalous feature vector, an alert is sent to a subscriber, allowing the subscriber to make further investigation. Whether or not an alert is sent, protection is continued as indicated by arrow 236 from 235 to protect-mode data collection 231. However, it is more accurate to characterize actions 231-235 as an ongoing pipeline than as a loop.

A feature vector that is not within, i.e., within the bounds of, at least one non-anomalous cluster is treated as anomalous. Thus, the bounds of a cluster must be determined. In the illustrated embodiments, the clusters are characterized by a centroid and a diameter. In that case, each cluster is, in effect, an n-dimensional sphere and the diameter is large enough so that sphere includes all the feature vectors that constitute the cluster. Characterizing a cluster using a single diameter or radius treats the cluster as isotropic (extending the same amount in every direction). In other embodiments, anisotropic clusters can be accommodated, e.g., by allowing the diameter or radius to change as a function of direction from the centroid. However, the additional processing required to accommodate anisotropic clusters may make it cost ineffective.

During protect-mode 230, but as a separate subprocess, adaptive cluster reformation is performed at 240. This helps the anomaly detection system to adapt the gradual changing of the network environment so that process 200 performs better than rule-based deterministic methods in the long term. At 240, the protect-mode cluster reformation is similar to the discovery-mode cluster formation at 223. However, the datapoints are weighted in favor of more recent datapoints; in other words, the weight of a datapoint decays over time as a function of process last update time in allowed behavior table 300. The effect is that the clusters gradually track changes in application behavior so that anomaly detections remain accurate.

Repeated cluster reformation introduces computational and storage overhead on the system. To limit this overhead, some embodiments use an exponentially weighted moving average (EWMA) to give more weight to new data and less weight to old data for re-training. The EWMA for a series Y may be calculated recursively: $S_t = Y$, $t=1$ and $S_t = a*Y_t + (1-a)*S_{(t-1)}$ $t>1$, where: 1) the coefficient "a" represents the degree of weighting decrease, a constant smoothing factor between 0 and 1; 2) a higher coefficient "a" discounts older observations faster; 3) $Y_t$ is the value at a time period t; and 4) $S_t$ is the value of the EWMA at any time period t.

Herein, art labelled "prior art", if any, is admitted prior art; are not labelled "prior art", if any, is not admitted prior art. The illustrated embodiments, variations thereupon, and modification thereto are within the scope of the present invention, the scope of which is defined by the following claims.

What is claimed is:

1. A computer-implemented method, performed within an enterprise application operating in a virtualized environment, for collecting process data characterizing processes and connections of a virtual machine using an application-protector agent installed in said virtual machine, said computer-implemented method comprising:
   collecting, by said application-protector agent, first said process data describing application processes of said virtual machine, said application-protector agent installed in said virtual machine;
   extracting, by said application-protector agent, first feature vectors from the process data;
   grouping, by said application-protector agent, the feature vectors to define or redefine non-anomalous clusters of feature vectors, wherein the non-anomalous clusters include respective centroids, each centroid associating with each of the plural process features a true value or a false value;
   collecting, by said application-protector agent, next process data describing application processes;
   extracting, by said application-protector agent, next feature vectors from the next process data;
   determining, by said application-protector agent, whether or not a next feature vector is within at least one of the non-anomalous clusters; and
   issuing an alert in response to a determination, by said application-protector agent, that the next feature vector is not within at least one of the non-anomalous clusters.

2. The method of claim 1 wherein:
   each feature represents a respective process instance, each feature vector associating with each of plural process features a true value or a false value, each true value indicating that the respective process data indicates that the respective feature has been present in the respective process instance, each false value indicating that the respective process data indicates that the respective feature has not been present in the respective process instance.

3. The method of claim 2 further comprising subset match filtering the next feature vectors to eliminate false positives, the filtering including filtering out feature vectors for which at least one of the centroids associates true values with every process feature with which the feature vector associates a true value so that the determining applies only to feature vectors for which there is no non-anomalous cluster with a centroid that associates true values with every process feature with which that feature vector associates a true value.

4. The method of claim 1 wherein the clusters are redefined more than once to adapt to changes in the normal behavior of an application.

5. The method of claim 1 wherein the grouping re-defines existing clusters and the re-defining involves attributing greater weight to more-recent feature vectors than to less-recent feature vectors that are given a non-zero weight.

6. The method of claim 1 wherein the grouping uses an X-means algorithm to define or re-define the clusters.

7. A system including an enterprise application operating in a virtualized environment, for collecting process data characterizing processes and connections of a virtual machine using an application-protector agent installed in said virtual machine, said system further comprising non-transitory media encoded with code that, when executed by a processor, implements a method including:
    collecting, by said application-protector agent, first said process data describing application processes of said virtual machine, said application-protector agent installed in said virtual machine;
    extracting, by said application-protector agent, first feature vectors from the process data;
    grouping, by said application-protector agent, the feature vectors to define or redefine non-anomalous clusters of feature vectors, wherein the non-anomalous clusters include respective centroids, each centroid associating with each of the plural process features a true value or a false value;
    collecting, by said application-protector agent, next process data describing application processes;
    extracting, by said application-protector agent, next feature vectors from the next process data;
    determining, by said application-protector agent, whether or not a next feature vector is within at least one of the non-anomalous clusters; and
    issuing an alert in response to a determination, by said application-protector agent, that the next feature vector is not within at least one of the non-anomalous clusters.

8. The system of claim 7 wherein:
    each feature represents a respective process instance, each feature vector associating with each of plural process features a true value or a false value, each true value indicating that the respective process data indicates that the respective feature has been present in the respective process instance, each false value indicating that the respective process data indicates that the respective feature has not been present in the respective process instance.

9. The system of claim 8 wherein the method further includes subset match filtering the next feature vectors to eliminate false positives, the filtering including filtering out feature vectors for which at least one of the centroids associates true values with every process feature with which the feature vector associates a true value so that the determining applies only to feature vectors for which there is no non-anomalous cluster with a centroid that associates true values with every process feature with which that feature vector associates a true value.

10. The system of claim 8 wherein the clusters are redefined more than once to adapt to changes in the normal behavior of an application.

11. The method of claim 7 wherein the grouping re-defines existing clusters and the re-defining involves attributing greater weight to more-recent feature vectors than to less-recent feature vectors that are given a non-zero weight.

12. The method of claim 7 wherein the grouping uses an X-means algorithm to define or re-define the clusters.

* * * * *